United States Patent [19]
Heck

[11] Patent Number: 5,423,642
[45] Date of Patent: Jun. 13, 1995

[54] CHAMFER CUTTING TOOL

[76] Inventor: Philip Heck, P.O. Box 425, 1480 Old U.S. 23, Hartland, Mich. 48353

[21] Appl. No.: 240,562

[22] Filed: May 11, 1994

[51] Int. Cl.⁶ .............................................. B27C 1/10
[52] U.S. Cl. ........................... 409/138; 144/136 D; 409/178; 409/204
[58] Field of Search ............... 409/138, 175, 178, 204; 144/134 D, 136 C, 136 D, 136 G; 279/6; 51/100 PT

[56] References Cited

U.S. PATENT DOCUMENTS

| | | | |
|---|---|---|---|
| 2,788,810 | 4/1957 | Jones | 144/136 C X |
| 3,069,819 | 12/1962 | Gilmore | 409/204 X |
| 4,622,090 | 11/1986 | Michaels | 144/136 G B |
| 4,655,653 | 4/1987 | Hall et al. | 409/182 |
| 4,881,857 | 11/1989 | Tanaka et al. | 409/138 |
| 5,028,179 | 7/1991 | Grasset | 409/180 |

FOREIGN PATENT DOCUMENTS 734911  8/1932  France ............................ 144/117 C Primary Examiner—Z. R. Bilinsky
Attorney, Agent, or Firm—Charles W. Chandler

[57] ABSTRACT

A portable tool for milling a chamfered edge on a workpiece, includes a cutting attachment installed on a motorized drive unit. The cutting attachment includes a rotary milling cutter partially encircled by a hood element that carries a V-shaped guide structure adapted for sliding engagement with edge areas of the workpiece. The hood is attached to the motorized drive unit by an eccentric cam means, which can be adjusted to vary the penetration distance of the milling cutter into the workpiece. Various cutting depths can be achieved by adjusting the hood in relation to the rotational axis of the motorized drive unit. The V-shaped guide is arcuately adjustable to vary the slant angle of the chamfered edge independently of the cutting depth adjustment.

14 Claims, 3 Drawing Sheets

CHAMFER CUTTING TOOL

BACKGROUND OF THE INVENTION

1. Field of the Invention

This invention relates to tools and machines for cutting a chamfer on the edge of a workpiece. The workpiece is typically a flat metal plate usually having a thickness ranging from 3/16" to 2". The cutting machine comprises a portable hand tool movable along the plate's edge to form a chamfered edge.

2. Prior Developments

Chamfering machines are designed to form chamfered edges on plates, blocks and pipe ends. Typically, the chamfering operation is performed by clamping the workpiece in a fixed position, and moving the chamfering machine by hand along the edge of the workpiece to form a chamfered edge.

The chamfering operation is often performed to remove burrs on the workpiece, or to increase the edge surface area prior to welding the workpiece to another mating piece. The chamfer provides a "V" groove at the juncture between the two pieces for achieving deeper and stronger welds.

The term "chamfering" is here used interchangeably with the term "beveling". Both terms are understood to mean a process whereby an edge of a workpiece is cut along its cross section to form a cross sectional edge angled obliquely to opposite faces of the workpiece.

U.S. Pat. Nos. 4,655,653, to Hall, et al; 5,028,179, to M. Grasset; and 4,881,857, to Y. Tanaka, illustrate typical prior art machines for forming chamfered edges on workpieces. Heck Industries, Inc. of Hartland, Mich. sells a beveling machine under the trademark BEVEL-MILL that uses a milling type cutter.

One problem with prior art chamfering machines is that the cutter has a relatively small diameter and relatively shallow cutting flutes. Typically the cutter diameter is less than $\frac{1}{4}$"; the cutting depth is only a few thousandth's of an inch.

When the workpiece is a thick metal plate having a thickness of about $\frac{1}{4}$", it is necessary to make several passes of the cutting machine along an edge of the workpiece in order to form a chamfered edge on the workpiece. After each pass, the guide mechanism on the machine has to be adjusted to achieve a desired cutting depth during the next pass. If the guide mechanism is not adjustable, then it becomes difficult to maintain a constant cutting depth along the entire length of the workpiece edge, so that the quality of the finished edge suffers.

The small diameter cutters used in prior art chamfering machines are usually powered by relatively small A.C. electric motors developing no more than about one half horsepower. Such motors are capable of powering the small diameter cutters used in prior art practice. However, such motors would not adequately power large diameter milling cutters, e.g. cutters having diameters on the order of $2\frac{1}{2}$", and cutting depths on the order of 0.100 inches. Such large diameter cutters, when adequately powered, perform a chamfering operation with a relatively small number of passes along the edge of the workpiece.

The present invention relates to a chamfering machine having a milling cutter having a relatively large diameter and a relatively large cutting depth, whereby the machine performs a chamfering operation with a relatively few passes of the machine along the edge of the workpiece.

The machine is preferably powered by an electric motor having a rating of at least two horsepower, whereby the milling cutter achieves a large cutting depth without overloading the motor. The motor is preferably a variable speed motor used previously for powering sanders and grinders. Such motors are available from various sources, e.g. Sioux Mfg., Black and Decker, and General Electric.

The chamfering machine includes a mechanism for adjusting the depth of cut, and a second adjusting mechanism for adjusting the slant angle of the chamfered edge. Typically, the slant angle of the chamfered edge can be varied between an angle of about 45° (relative to the plane of the workpiece major surface) to an angle of about 15°. The two adjusting mechanisms are separate and independent, such that one adjustment does not adversely affect the machine setting achieved with the other adjustment mechanism.

The machine is designed for a two-handed operation. A first handle extends from the motorized drive unit. A second handle (or knob) is mounted on a hood assembly that overlies the rotary milling cutter. The person operating the chamfering machine grasps the two handles (using two hands) and moves the machine along an edge surface of the workpiece to form a chamfered edge.

The chamfering machine is designed for an easy two-handed operation to easily and quickly achieve each cutting pass of the machine. An elongated V-shaped guide structure is incorporated into the machine, whereby the rotary cutter has a predetermined constant cutting depth along the workpiece edge during any given pass of the machine. The finished edge surface is smooth and flat, without ridges, valleys or other surface irregularities. The V-shaped guide structure is adjustable around the apex of the V, such that the slant angle of the chamfered edge surface can be changed or varied to meet different needs or requirements.

THE DRAWINGS

DESCRIPTION OF THE PREFERRED EMBODIMENT OF THE INVENTION

Figure 1:
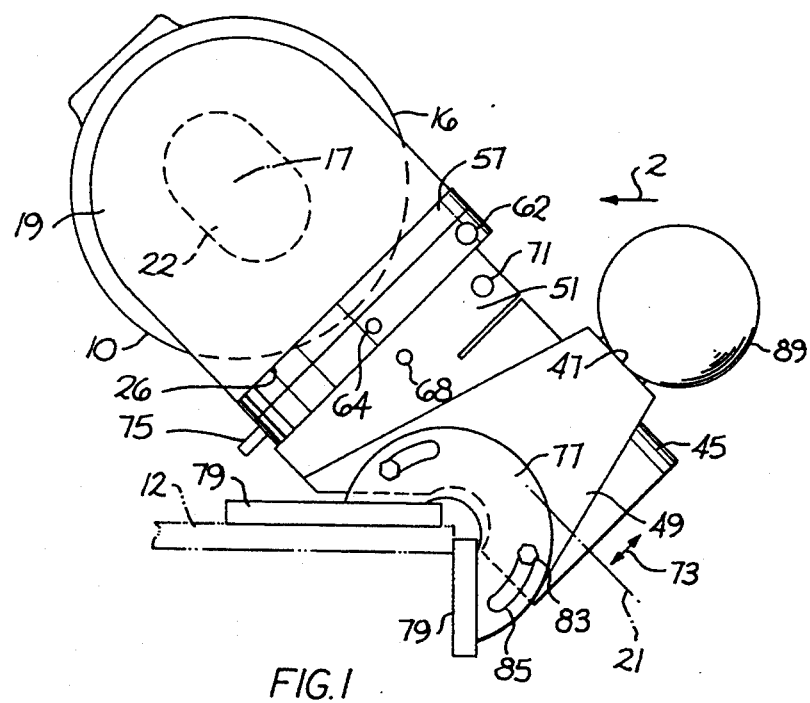
FIG. 1 is an end view of a portable tool constructed according to the invention.
Figure 2:
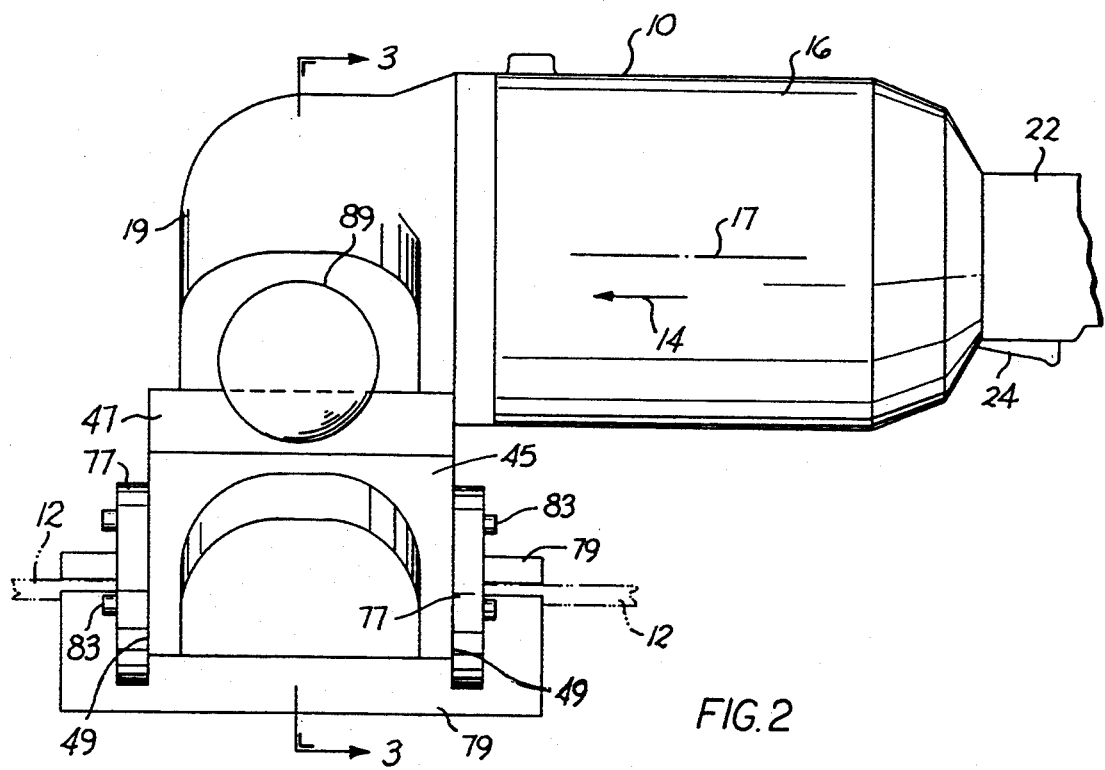
FIG. 2 is a front elevational view of the FIG. 1 tool, taken in the direction of arrow 2 in FIG. 1.
Figure 3:
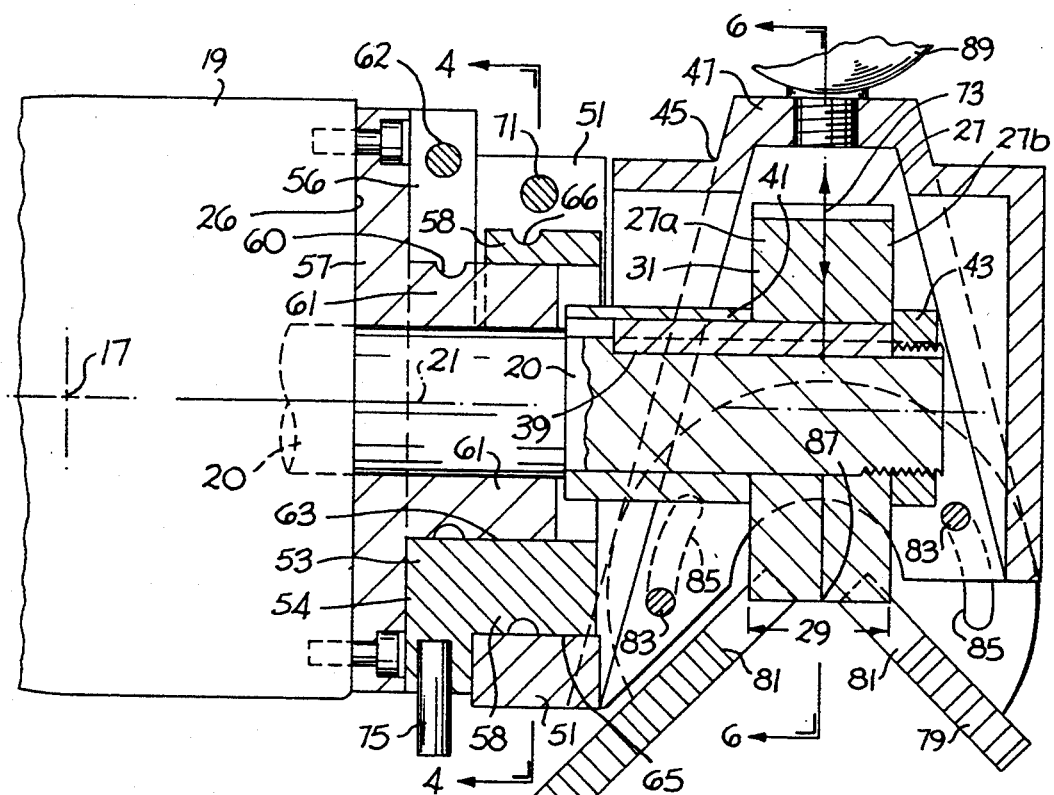
FIG. 3 is an enlarged fragmentary sectional view taken on line 3—3 of FIG. 2.

FIGS. 1 through 3 illustrate a portable tool 10 for milling a chamfered edge on a workpiece 12. The portable tool is designed for movement along an edge of the workpiece as a rotary milling cutter in the tool machines a chamfer on the workpiece edge. Numeral 14 in FIG. 2 indicates the direction of tool movement along the workpiece for machining the chamfered edge.

In some instances, it may be desirable to mount the tool in a fixed position and advance the workpiece across the tool, i.e. a direction opposite to arrow 14. Such situations would involve small workpieces for deburring operations, where it may be more convenient to manipulate the workpiece rather than the tool.

The portable tool has an electric motor 16 having a rotational axis 17, and a right angle drive unit 19 attached to the left end of the motor for changing the drive direction, e.g. from horizontal obliquely downwardly at a 45° angle to the vertical (as depicted in FIG. 1).

Right angle drive unit 19 includes a small diameter bevel gear mounted on the motor drive shaft, and a large diameter bevel gear mounted on an output shaft 20 to change the shaft's speed and direction of rotation. The motor speed is on the order of 5000–10,000 revolutions per minute. The rotational speed of output shaft 20 is in the range of 1500–3000 revolutions per minute. The motor is equipped with a manual speed control for varying the motor speed, and hence the speed of output shaft 20.

An elongated handle 22 extends from the right end of motor 16 approximately on the motor centerline. The handle is fragmentarily shown in FIG. 2. A manual trigger 24 is incorporated into handle 22 for turning the motor on or off. The person using the tool will usually have the fingers of one hand curled around the handle, with his thumb aligned with trigger 24. Thumb pressure on the trigger turns the motor on. Releasing the trigger turns the motor off.

Figure 6:
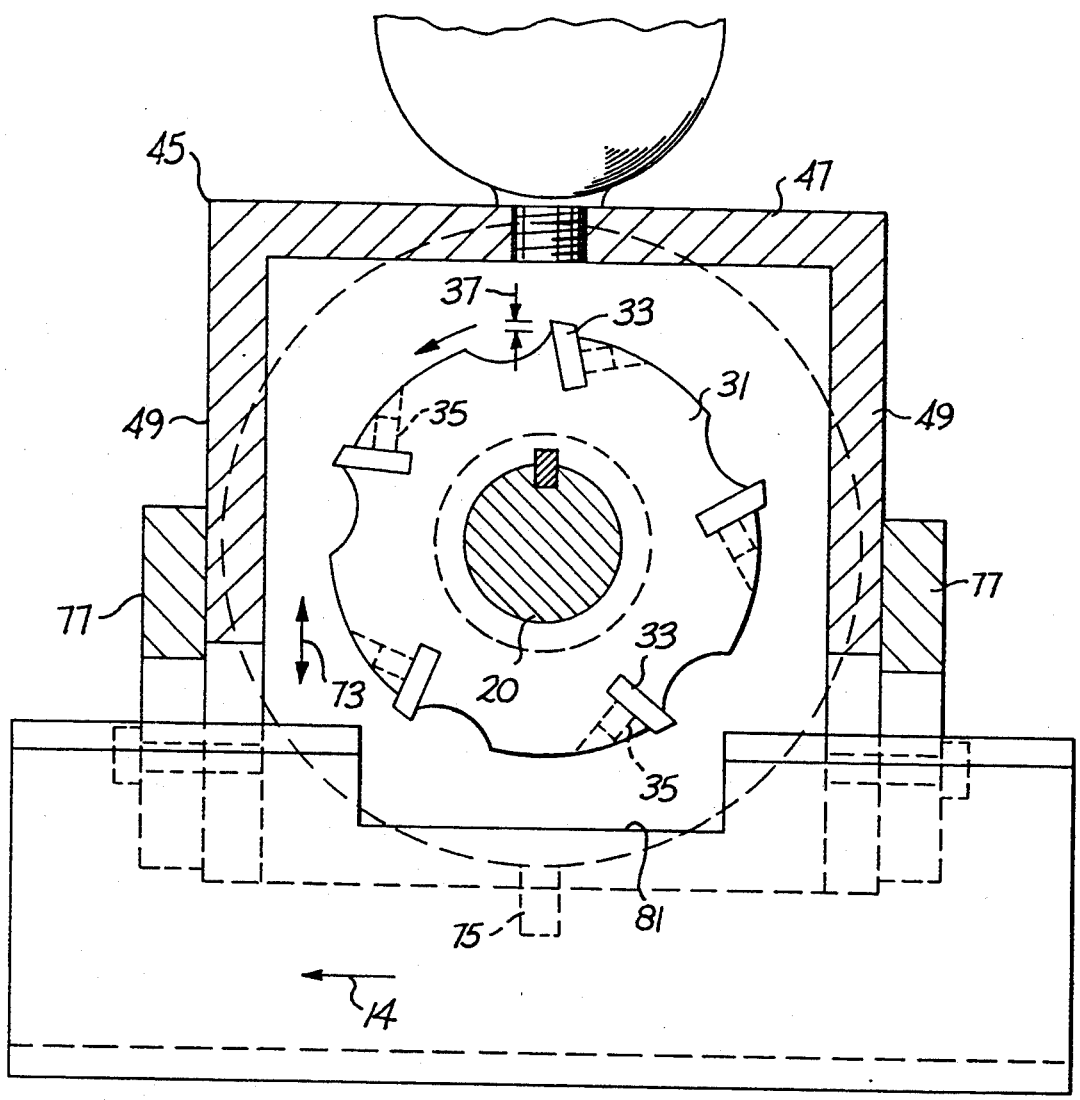
FIG. 6 is a view taken on line 6—6 in FIG. 3.

As shown in FIG. 3, output shaft 20 extends to the right beyond face 26 of drive unit 19 to support a milling cutter 27. FIG. 6 shows the cutter outline. The milling cutter, as depicted in FIG. 3, comprises two circular cutter assemblies 27a and 27b stacked together on shaft 20 to provide a cutting width dimension 29 (FIG. 3). If a smaller cutting width is sufficient for a given chamfer operation (e.g. on a relatively thin workpiece), then a single milling cutter assembly 27a or 27b can be used. The milling cutter assemblies are identical.

As shown in FIG. 6, the milling cutter assembly comprises a circular metal disk 31 that is slotted at spaced points around its peripheral edge to mount replaceable cutting inserts 33. Each cutting insert is held in the associated slot by a set screw 35 threaded into a threaded opening in disk 31. The set screw is normal to the back face of the cutting insert.

The diameter of each disk 31 is at least twice the diameter of shaft 20. Typically the shaft 20 diameter may be about 1", whereas the disk 31 diameter may be about 2½". Each cutting insert 33 projects from the peripheral edge surface of the disk by a projection distance 37. Distance 37 is typically about 0.100". The cutter has a chip load of about 0.010". A single pass of the tool along the workpiece provides a cut of about 0.580".

Figures 7, 8:
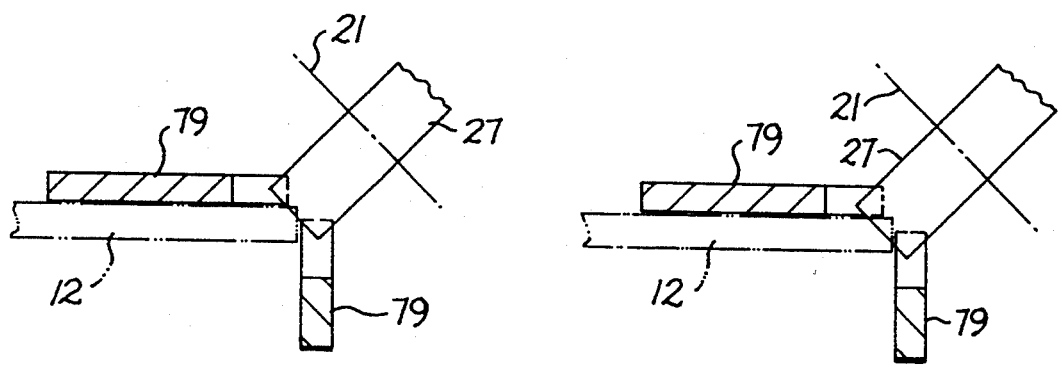
FIGS. 7 and 8 are schematic representations of a milling cutter of this invention adjusted for two consecutive passes of the tool along the workpiece.

Milling cutter 27 is illustrated in FIGS. 7 and 8 with a straight cutting tip for milling a flat chamfer surface. A milling cutter having a concave tip can be used to mill a rounded chamfer surface.

FIG. 3 shows a key 39 located in a slot in shaft 20 for preventing rotation of the cutter assembly relative to the shaft. A collar 41 encircles the shaft to locate the cutter assembly in a desired cutting plane on the shaft. Nut 43 retains the cutter assembly on the shaft. If a single milling cutter element is used, a different length collar 41 is employed to maintain the cutter element in a desired cutting plane.

As shown in FIG. 6, hood element 45 partially encircles cutter 27 for containing the metal chips generated in the milling operation. Hood element 45 includes a flat roof 47 and two transverse end walls 49 (FIG. 6) spaced substantially equidistant from shaft axis 21. In FIG. 3, numeral 48 denotes the lower edges of hood end walls 49. The hood has sufficient interior space to accommodate the circular milling cutter assembly without interfering with the cutting action.

An integral split collar 51 attaches the hood element to a circular cam member 53. Cam member 53 has a split collar 55 for attaching the cam member to an adapter 57. The cam member and adapter are concentric with output shaft 20.

Adapter 57 comprises a circular plate bolted to face 26 of drive unit 19, and a circular hub 61 projecting axially from the circular plate to form a circular mounting surface for cam member 53.

Cam member 53 comprises a circular plate 54 adapted to abut against the plate portion of adapter 57. The cam member has an axial annular projection 58 designed for rotary adjustment around axis 21.

Circular plate 54 has a radial slit 56 that forms two spaced clamp sections Screw 52 extends through the clamp sections, such that when the screw is tightened, the clamp sections are incrementally drawn toward each other to clamp cam member 53 to circular hub 61. A circular hole 63 extends through cam member 53 as a sliding fit on the circular hub surface, whereby cam member 53 is rotationally adjustable around shaft axis 21 (when screw 62 is loose).

Projection 58 has a circular cam surface 65 centered on an axis 67 (FIG. 4) eccentric to shaft axis 21. Split collar 51 (carried by hood element 45) has a circular hole slidably fitting on cam surface 65, whereby the assembly can be rotatably adjusted on cam member 53 around eccentric axis 67. The circular hole in collar 51 serves as a cam follower surface cooperating with circular cam surface 65. Pin 75 is used to manually rotate cam member 53.

Figure 4:
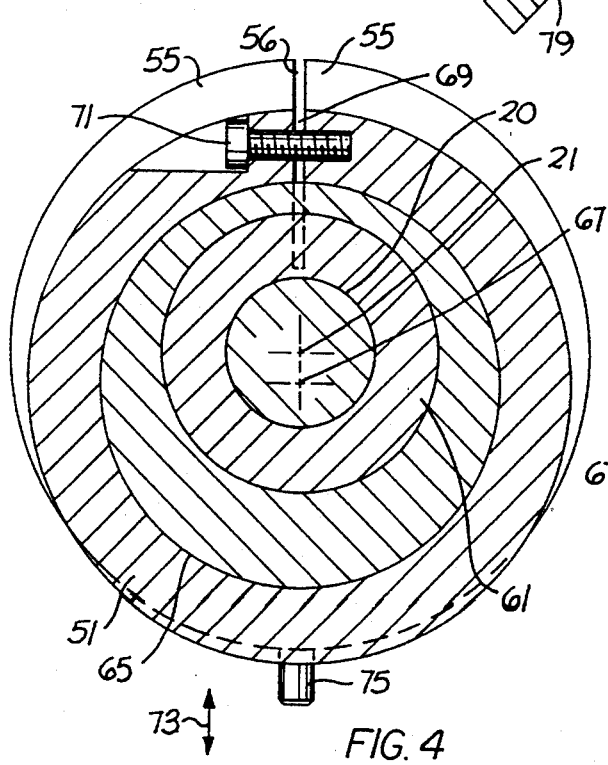
FIG. 4 is a sectional view taken on line 4—4 in FIG. 3.

As shown best in FIG. 4, collar 51 has a radial slit 69 that subdivides the collar into two spaced gripper sections. A clamp screw 71 extends through the gripper sections, so that when screw 71 is tightened, the gripper sections are drawn toward each other (by a very small incremental distance), locking collar 51 onto cam member 53. Collar 51 (and the associated hood element 45) can be rotated on circular cam surface 65 when screw 71 is in a loosened condition.

Cam member 53 serves as an adjustable connector means between adapter 57 and the hood assembly, whereby the hood assembly can be adjusted in a direction paralleling the rotational plane of cutter 27. Numeral 73 references the direction of the hood adjustment.

In order to prevent axial separation of cam member 53 from adapter 57, the surface of hub 61 has endless groove 60. A radial screw 64 (FIG. 1) is threaded through the cam member so that the tip of the screw extends into groove 60. The screw prevents cam member 53 from axially separating from adapter 57, while permitting the cam member to be rotatably adjusted around (on) hub 61.

In order to prevent collar 55 from axially sliding off circular cam surface 65, surface 65 has an endless groove 66. A radial screw 68 extends through collar 55 so that the tip of the screw seats in groove 66. The screw prevents collar 55 from shifting axially on surface 65, while permitting the collar to be rotationally adjusted around eccentric axis 67.

Figure 5:
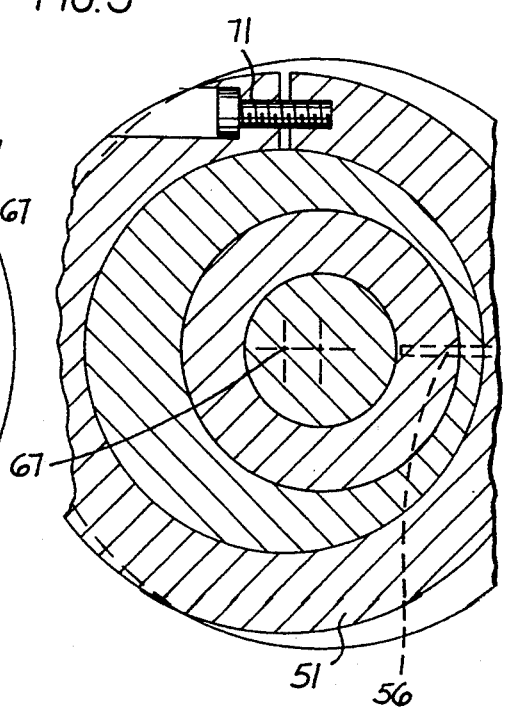
FIG. 5 is a view taken in the same direction as FIG. 4, but with certain parts in a different condition of adjustment.

FIG. 4 shows the position of collar 51 required for adjusting hood 45 downwardly. FIG. 5 shows the position of collar 51 required for adjusting hood 45 upwardly.

To make a hood adjustment, from the FIG. 4 condition to the FIG. 5 condition, clamp screw 62 is loosened slightly, and pin 75 is moved in a clockwise direction so that eccentric axis 67 is moved arcuately upwardly around shaft axis 21 to the FIG. 5 position. Clamp screw 62 is then tightened and screw 71 loosened slightly to permit hood element 45 to remain horizontal (i.e. with its end walls 49 generally vertical).

The hood adjustment depicted by FIGS. 4 and 5 represents one half the total hood adjustment possibly. By moving pin 75 clockwise for 180° (to the twelve o'clock position in FIG. 4), the hood can be adjusted through a distance that is twice the eccentricity of axis 67 from shaft axis 21. Typically, the hood maximum adjustment will be about 0.400" (for 180° turn of pin 75).

A guide means is attached to hood element 45 for sliding engagement with workpiece 12, so that cutter 27 maintains contact with the workpiece edge while the tool is being moved along the workpiece surface. Referring to FIGS. 1 and 3, the guide means comprises two sector plates 77 facially engaged with hood end walls 49, and two flat guide plates 79 extending between the sector plates in a 90° "V" configuration. Guide plates 79 can be secured to sector plates 77 in any suitable fashion, e.g. by welding or by screws extending through the guide plates into the edges of the sector plates. Each guide plate 79 has a cut-out 81 providing clearance for rotary cutter 27, whereby the cutter can rotate freely without striking the adjoining edges of plates 79.

The V-shaped guide means is adjustably attached to the end walls 49 of hood element 45 by two sets of clamp screws 83. Each screw 83 is threaded into a threaded hole in a hood end wall 49. The shank of each screw extends through an arcuate slot 85 in sector plate 77, so that when the screws are loosened slightly the V-shaped guide structure can be rotatably adjusted around the axis defined by arcuate slots 85. In FIG. 3 the adjustment axis is denoted by numeral 87.

The tool is employed so that one of the guide plates 79 slides along a face of workpiece 12, while the other guide plate 79 slides along an edge surface of the workpiece. FIG. 1 shows the desired orientation of the tool relative to the workpiece. The workpiece is not shown in FIG. 3.

As the tool is moved along the workpiece, the rotary cutter mills an oblique chamfer surface along the edge of the workpiece. The human operator uses two hands to guide and control the tool, such that the two guide plates 79 slide along the workpiece during the entire pass of the tool. The operator grasps handle 22 with one hand. The other hand is placed on a knob-like handle 89 mounted on roof 47 of hood element 45, such that the tool is adequately controlled and pressured into the desired cutting contact with the workpiece.

Knob 89 has a centerline that extends through shaft axis 21 in the rotational plane of cutter 27. This location of the knob ensures that when the operator exerts a downward force on the knob, the force will be exerted through the cutting insert contact area with the workpiece. The knob will then adequately resist any reaction force generated by the workpiece in opposition to the cutting action. Handle 22 supports the weight of motor 16, and also exerts a horizontal pushing force on the tool for advancing the tool along the workpiece.

The V-shaped guide, as shown in FIGS. 1 and 3, is set so that cutter 27 forms a chamfer surface having a slant angle of 45° (relative to the major force of the workpiece). By rotatably adjusting sector plates 77 around adjustment axis 87, it is possible to produce chamfer surfaces having different chamfer angles. With the slot 85 dimensions shown in FIG. 3, the chamfer slant angle can be varied from about 45° to about 15°.

When the workpiece is relatively thick, the cutting depth of cutter 27 may not be sufficient to form a desired chamber surface with a single pass of the tool. FIGS. 7 and 8 show the cutter position during successive passes of the tool in order to form a chamfer on a relatively thick workpiece (e.g. a workpiece having a thickness of about ⅜"). The first pass (represented by FIG. 7) is accomplished with hood 45 adjusted downwardly so that guide plates 79 permit only a slight overlapping of the cutter teeth and the corner area of the workpiece.

After the first pass (FIG. 7), hood element 45 is adjusted upwardly (by operation of pin 75) such that the cutter teeth project a greater distance into the planes of guide plates 79. FIG. 8 shows the second pass of the tool, whereby a full depth chamfer is formed on the edge of the workpiece.

The tool is designed so that adjustment of hood element 45 to achieve different penetrations of the cutter into the workpiece profile is accomplished independently of the adjustment needed to vary the chamfer slant angle. The cutting action of the tool is relatively precise and repeatable for different settings of the adjusting mechanisms. Also, the tool is easily controllable by using the two handles 22 and 89 together.

What is claimed is:

1. A portable tool for milling a chamfer on an edge of a workpiece, comprising:

an electric motor having a drive axis and a first handle extending from said motor;

a right angle drive unit connected to said motor, said drive unit having an output shaft rotatable on a second axis normal to said motor drive axis;

a milling cutter mounted on said output shaft for rotation in a plane normal to a plane containing the motor drive axis and the second axis;

a hood partially encircling said cutter, and a second handle connected to said hood;

means for attaching said hood to said right angle drive unit, whereby the motor, drive unit and hood are moveable as an entity;

said first and second handles being adapted for gripping by a person's hands so that the tool is moveable along a workpiece in a direction substantially parallel to the motor drive axis;

guide means carried by said hood for sliding engagement with a workpiece so that the cutter maintains contact with an edge of the workpiece while the tool is being moved along the workpiece;

said attaching means comprising an adjusting mechanism for adjusting said hood in the cutter rotational plane, to thereby vary the depth of cut of the cutter;

said adjusting mechanism comprising an adapter attached to said right angle drive unit, said adapter having a circular hub surface concentric with said second axis; a cam member rotatably adjustable on said hub surface, said cam member having a circular cam surface center on an axis eccentric to said second axis; and a collar carried by said hood; said collar having a circular cam follower surface rotatable on said circular cam surface, whereby said hood can be adjusted around said eccentric axis; and said collar having a radial slit therein to form two spaced gripper sections, and a second screw means for drawing said gripper sections toward each other for releasably locking said collar to said cam member.

2. A chamfer cutting attachment for use on a motorized drive unit, wherein said drive unit has an output shaft rotatable on an axis: said cutting attachment comprising an adapter mountable on the drive unit in surrounding relation to the drive unit output shaft; said adapter having a circular hub surface concentric with the shaft axis; a cam member rotatably adjustable on said hub surface, said cam member having a circular cam surface centered on an axis eccentric to said shaft axis; a milling cutter mountable on the output shaft for rotation in a plane normal to the shaft axis; a hood assembly encircling said cutter; said hood assembly comprising a collar having a circular cam follower surface rotatable on said circular cam surface, whereby said hood assembly can be adjusted around said eccentric axis; and a guide means carried by said hood assembly for sliding engagement with a workpiece so that the cutter maintains contact with an edge of the workpiece while the cutting attachment is being moved along the workpiece parallel to the rotational plane of the cutter.

3. The chamfer cutting attachment of claim 2, wherein said cam member has a radial slit therein forming two spaced clamp sections, and a screw means for drawing said clamp sections toward each other for clamping said cam member to said adapter.

4. The chamfer cutting attachment of claim 3, wherein said collar has a radial slit therein to form two spaced gripper sections, and a second screw means for drawing said gripper sections toward each other for releasably locking said collar to said cam member.

5. The chamfer cutting attachment of claim 2, wherein said hood assembly comprises a hollow hood element having a roof in the rotational plane of said cutter, and two end walls extending transverse to the direction of movement of the cutting attachment along a workpiece; and a handle mounted on said roof in direct alignment with the rotational center of the cutter, whereby the user is enabled to exert a force tending to pressure the guide means against an edge of a workpiece.

6. The chamfer cutting attachment of claim 5, wherein said handle is a knob located midway between the end walls of the hood element.

7. The chamfer cutting attachment of claim 5, wherein said guide means comprises two sector plates in facial engagement with said hood element end walls, and two flat guide plates extending between said sector plates; said guide plates being oriented at right angles to one another so that one guide plate is slidable along a facial surface of a workpiece while the other guide plate is slidable along an edge surface of the workpiece.

8. The chamfer cutting attachment of claim 7, and further comprising cut outs in said guide plates for allowing said cutter to penetrate the plate planes without striking the plates.

9. The chamfer cutting attachment of claim 2, wherein said milling cutter has a diameter that is at least twice the diameter of the output shaft; said cutter having a peripheral edge surface and a multiplicity of cutter teeth projecting outwardly from said peripheral edge surface by a projection distance of at least 0.100 inch.

10. The chamfer cutting attachment of claim 12, in which the motorized drive unit includes a direct current drive motor.

11. A portable tool for milling a chamfer on an edge of a workpiece, comprising:

an electric motor having a drive axis and a first handle extending from said motor;

a right angle drive unit connected to said motor, said drive unit having an output shaft rotatable on a second axis normal to said motor drive axis;

a milling cutter mounted on said output shaft for rotation in a plane normal to a plane containing the motor drive axis and the second axis;

a hood partially encircling said cutter, and a second handle connected to said hood;

means for attaching said hood to said right angle drive unit, whereby the motor, drive unit and hood are moveable as an entity;

said first and second handle being adapted for gripping by a person's hands so that the tool is moveable along a workpiece in a direction substantially parallel to the motor drive axis;

guide means carried by said hood for sliding engagement with a workpiece so that the cutter maintains contact with an edge of the workpiece while the tool is being moved along the workpiece;

said attaching means comprising an adjusting mechanism for adjusting said hood in the cutter rotational plane, to thereby vary the depth of cut of the cutter; and said hood having a roof facing said second axis, and two end walls extending transverse to the movement direction of the tool; said guide means comprising two sector plates in facial engagement with said hood end walls, and two flat guide plates extending between said sector plates; said guide plates being oriented at right angles to one another so that one guide plate is slidable along a facial surface of a workpiece while the other guide plate is slidable along an edge surface of the workpiece.

12. The tool of claim 11, wherein said sector plates are rotationally adjustable on said hood end walls around an axis paralleling the intersection line between the two guide plates, whereby said guide means is adjustable to vary the slant angle of the chamfer on the edge of the workpiece.

13. The tool of claim 11, wherein said milling cutter has a diameter that is at least twice the diameter of said output shaft, whereby the cutter has a relatively wide range of cutting depths equivalent to the range of adjustment of the hood in the cutter rotational plane.

14. The tool of claim 11, in which the motor is a direct current motor.

* * * * *